(12) United States Patent
Kusaba et al.

(10) Patent No.: US 11,262,276 B2
(45) Date of Patent: Mar. 1, 2022

(54) MONITORING SYSTEM

(71) Applicant: MITSUBISHI HEAVY INDUSTRIES, LTD., Tokyo (JP)

(72) Inventors: Naoki Kusaba, Tokyo (JP); Toshiyuki Yamada, Tokyo (JP); Yoshinori Kamiya, Tokyo (JP); Nobukazu Naito, Tokyo (JP); Naoki Yamasaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 168 days.

(21) Appl. No.: 16/607,599

(22) PCT Filed: Mar. 23, 2018

(86) PCT No.: PCT/JP2018/011844
§ 371 (c)(1),
(2) Date: Oct. 23, 2019

(87) PCT Pub. No.: WO2018/198624
PCT Pub. Date: Nov. 1, 2018

(65) Prior Publication Data
US 2020/0072707 A1 Mar. 5, 2020

(30) Foreign Application Priority Data
Apr. 25, 2017 (JP) .............................. JP2017-086540

(51) Int. Cl.
*G06F 11/30* (2006.01)
*G01M 99/00* (2011.01)
*G05B 23/02* (2006.01)

(52) U.S. Cl.
CPC ....... *G01M 99/005* (2013.01); *G05B 23/0227* (2013.01)

(58) Field of Classification Search
CPC .................................................. G01M 99/005
See application file for complete search history.

(56) References Cited

U.S. PATENT DOCUMENTS

| 2007/0043539 A1 | 2/2007 | Niina et al. |
| 2014/0114442 A1 | 1/2014 | Li |

(Continued)

FOREIGN PATENT DOCUMENTS

| EP | 2 048 562 | 4/2009 |
| JP | 10-003313 | 1/1998 |

(Continued)

OTHER PUBLICATIONS

International Search Report dated Jun. 26, 2018 in International (PCT) Patent Application No. PCT/JP2018/011844, with English Translation.

(Continued)

*Primary Examiner* — Phuong Huynh
(74) *Attorney, Agent, or Firm* — Wenderoth, Lind & Ponack, L.L.P.

(57) ABSTRACT

A monitoring system includes a real-time detection device configured to detect a state of target equipment and an instruction output from a central control device configured to input a control instruction to the target equipment; and a monitoring device configured to acquire information from the real-time detection device. The monitoring device includes an analysis unit configured to simulate the state of the target equipment, with models of the target equipment and the central control device, and a determination unit configured to determine whether an abnormality has occurred in the target equipment. The analysis unit is configured to simulate the state of the target equipment, using the latest information detected by the real-time detection device. The determination unit is configured to compare a (Continued)

result calculated by the analysis unit using the latest information detected by the real-time detection device.

3 Claims, 2 Drawing Sheets

(56) References Cited

U.S. PATENT DOCUMENTS

| | | |
|---|---|---|
| 2015/0184549 A1 | 7/2015 | Pamujula |
| 2015/0346706 A1 | 12/2015 | Gendelman |

FOREIGN PATENT DOCUMENTS

| | | | |
|---|---|---|---|
| JP | 2014-96145 | * | 5/2014 |
| JP | 2016-104987 | | 6/2016 |
| JP | 2016-106298 | | 6/2016 |

OTHER PUBLICATIONS

Written Opinion of the International Searching Authority dated Jun. 26, 2018 in International (PCT) Patent Application No. PCT/JP2018/011844.

Extended European Search Report dated Nov. 13, 2020 in corresponding European Patent Application No. 18791450.2.

* cited by examiner

MONITORING SYSTEM

FIELD

The present invention relates to a management monitoring system.

BACKGROUND

There are various industrial systems such as plant facilities for manufacturing and for generating electric power, infrastructure facilities for providing electricity and gas and for managing communication lines, transportation equipment such as trains and airplanes, and the like. Such industrial systems are increasingly connected to a communication network (Internet network) to be managed. An industrial system connected to a communication network like this cannot be properly operated when the control of the industrial system is interfered with cyber-attacks such as malware and distributed denial of service attacks (DDoS). Moreover, even when an industrial system is not connected to the Internet, the industrial system can be exposed to cyber-attacks and disabled due to malware received through a storage medium or loaded in equipment in advance.

As a device for managing the operation of industrial systems, a method for evaluating, with actual operation data and simulation data, whether the industrial systems are properly operated has been known.

SUMMARY

Technical Problem

The system disclosed in Japanese Patent Application Publication No. 2016-104987 controls the operation by analyzing target load information. However, the system may not be able to identify the state of the industrial plant accurately or in detail. When the state of the industrial plant cannot be identified accurately, it is not possible to accurately determine whether the industrial plant is properly operated under the influence of cyber-attacks.

The present invention has been made to solve the above-described problems, and an object of the present invention is to provide a management monitoring system capable of monitoring an industrial system to be managed with higher accuracy.

Solution to Problem

To solve the problem described above and achieve the object, a management monitoring system according to the present disclosure includes a real-time detection device configured to detect a state of target equipment and an instruction output from a central control device configured to input a control instruction to the target equipment; and a management monitoring device configured to acquire information from the real-time detection device. The management monitoring device includes an analysis unit configured to simulate the state of the target equipment, with models of the target equipment and the central control device, and a determination unit configured to determine whether an abnormality has occurred in the target equipment, by comparing a result calculated by the analysis unit with information acquired from the real-time detection device.

It is preferable that the management monitoring device is installed in a facility where the target equipment is installed.

It is preferable that the determination unit updates an abnormality determination threshold, based on the information on the real-time detection device.

It is preferable that the analysis unit calculates the instruction output from the central control device, based on the state of the target equipment, and the determination unit determines whether an abnormality has occurred in the central control device, by comparing the instruction output from the central control device that is calculated by the analysis unit with an instruction acquired by the real-time detection device.

It is preferable that the management monitoring device further includes an accumulation unit configured to accumulate previous information detected by the real-time detection device, and the determination unit determines whether an abnormality has occurred in the target equipment, by comparing the previous information accumulated in the accumulation unit with current information detected by the real-time detection device.

Advantageous Effects of Invention

According to the present invention, it is possible to effectively monitor an industrial system to be managed with higher accuracy.

DESCRIPTION OF EMBODIMENTS

Hereinafter, an embodiment of an industrial plant having a management monitoring system according to the present application will be described in detail with reference to the accompanying drawings. The management monitoring system according to the present application should not be limited to the following embodiment. The present embodiment is applied to an industrial plant 10. However, for example, a management monitoring system 18 of the present embodiment may also be applied to transportation equipment such as trains and road traffic, when various infrastructures such as electric power, gas, water supply, chemical, and oil are to be monitored and controlled.

Figure 1:
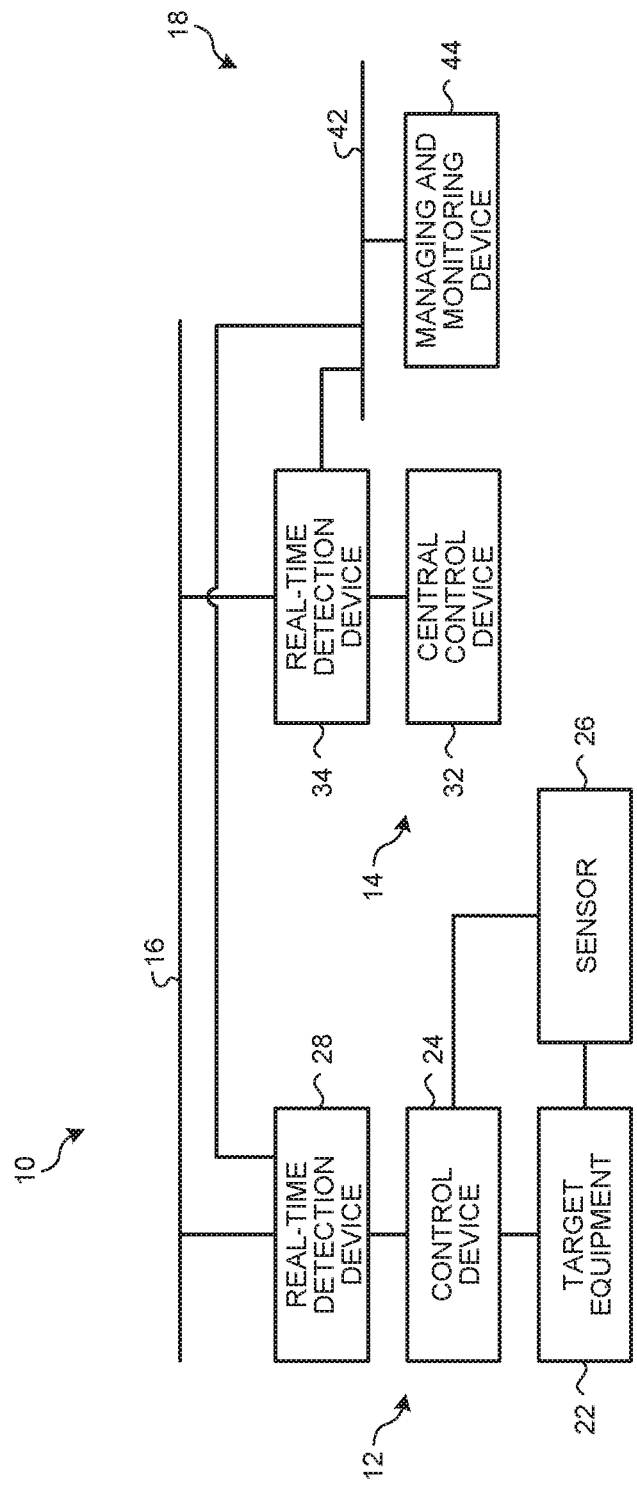
FIG. 1 is a schematic diagram illustrating the entire configuration of an industrial plant having a management monitoring system according to the present embodiment.

First, a configuration example of a monitoring and controlling network system will be described with reference to FIG. 1. FIG. 1 is a schematic diagram illustrating the entire configuration of an industrial plant having a management monitoring system according to the present embodiment. The industrial plant 10 according to the present embodiment includes a plant facility 12, a control unit 14, a communication bus 16, and the management monitoring system 18. It is to be noted that the configuration illustrated in FIG. 1 is merely an example, and the specific configuration and the number of devices are not particularly limited. Only a single plant facility 12 is illustrated. However, the management monitoring system 18 manages and monitors a plurality of the plant facilities 12. The communication bus 16 is connected to the plant facility 12 and the control unit 14, and transmits and receives data. The communication bus 16 may be connected to public communication, or may not be connected to public communication. Moreover, the communication bus 16 may be wireless communication or wired communication.

The plant facility 12 is a plant for manufacturing products, a plant for generating electric power, and the like. The plant facility 12 includes target equipment 22, a control device 24, a sensor 26, and a real-time detection device (first real-time detection device) 28. The real-time detection device (first real-time detection device) 28 is a part of the management monitoring system 18. The target equipment 22 is equipment to be monitored and managed by the plant facility 12. In a power generation plant, the target equipment 22 may be a part of the plant facility such as a generator, a gas turbine, and a boiler; or equipment such as a valve, a pump, and a motor of the power generation plant.

The control device 24 controls the operation of the target equipment 22. The control device 24 controls the operation of the target equipment 22, on the basis of information input from the control unit 14, and the detection result of the sensor 26. The sensor 26 detects the state of the target equipment 22. The sensor 26 detects temperature, pressure, rotation, and the like. The real-time detection device (first real-time detection device) 28 is connected between the sensor 26 and the communication bus 16, and between the control device 24 and the communication bus 16. The real-time detection device 28 detects information input to and output from the sensor 26 and the control device 24. The real-time detection device 28 outputs the detected data to a management monitoring device 44 of the management monitoring system 18. The real-time detection device 28 obtains the state (sensor value) of the target equipment 22 detected by the sensor 26 and the control result of the plant facility 12, as output data of the plant facility 12.

The control unit 14 monitors the state of the plant facility 12. When an operator or the like inputs an operation, the control unit 14 controls the operation of the plant facility 12. The control unit 14 includes a central control device 32 and a real-time detection device (second real-time detection device) 34. The central control device 32 is connected to the communication bus 16. The central control device 32 includes a display device, an operation console, and the like. The central control device 32 causes the display device to display information output from the target equipment 22 and the sensor 26. An operator or the like operates the operation console and inputs an operation. The central control device 32 transmits the operation to the control device 24 of the plant facility 12 via the communication bus 16. For example, the central control device 32 transmits a control command for instructing the target equipment 22 to turn on power supply, and a control command for instructing the target equipment 22 to turn off power supply. The real-time detection device (second real-time detection device) 34 is connected between the central control device 32 and the communication bus 16. The real-time detection device 34 detects information input to and output from the central control device 32. The real-time detection device 34 outputs the detected data to the management monitoring device 44 of the management monitoring system 18.

The management monitoring system 18 manages and monitors the states of the plant facility 12 and the control unit 14. The management monitoring system 18 includes the real-time detection devices 28 and 34, a communication bus 42, and the management monitoring device (security management device) 44. The communication bus 42 connects the real-time detection devices 28 and 34 with the management monitoring device 44, and transmits and receives data. The management monitoring system 18 is disposed in the same facility as that of the plant facility 12 (target equipment 22) and the control unit 14, and is not disposed away from the control unit 14. Moreover, the protocol of data transmitted through the communication bus 42 is different from the protocol of data transmitted through the communication bus 16. It is to be noted that the real-time detection devices 28 and 34 may also be a single device. In other words, in the present embodiment, a total of two real-time detection devices are used. However, a single real-time detection device may be provided in one of the plant facility 12 and the control unit 14. Moreover, three or more of the real-time detection devices 28 and 34 may be provided.

Figure 2:
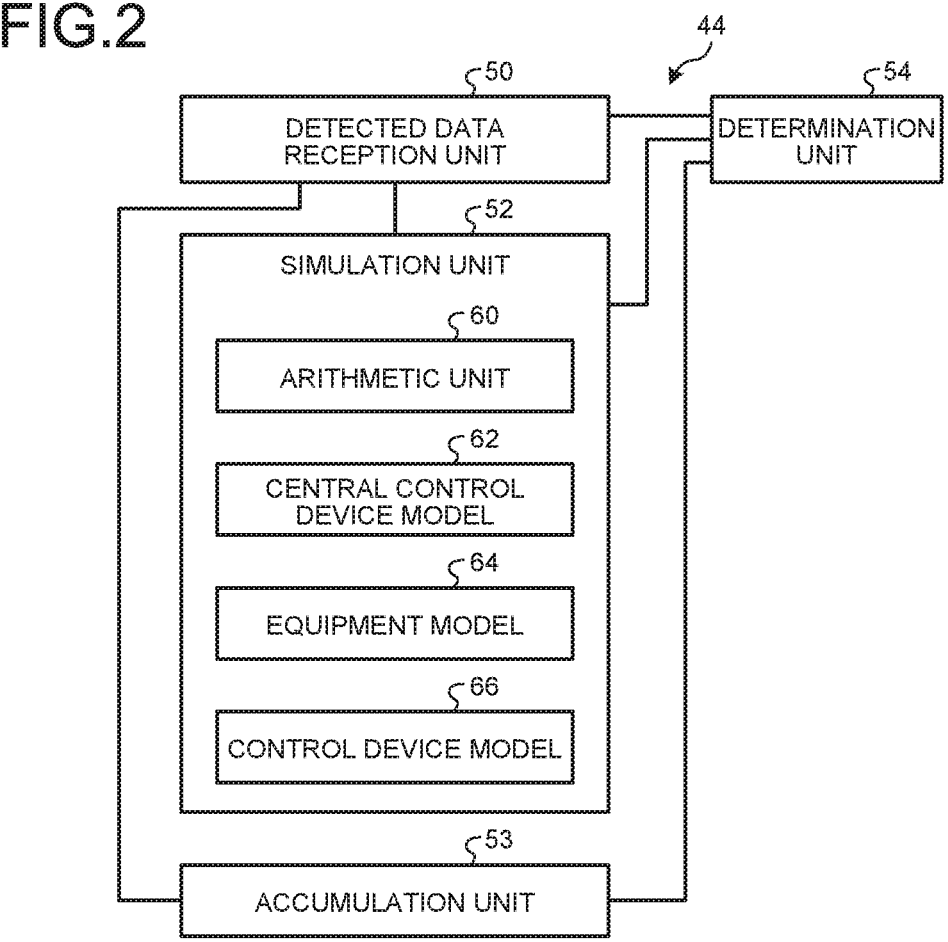
FIG. 2 is a schematic view illustrating a configuration of a management monitoring device.

FIG. 2 is a schematic view illustrating a configuration of a management monitoring device. The management monitoring device 44 includes an arithmetic device, a storage device, and the like. The management monitoring device 44 is a device for analyzing and determining, by performing arithmetic processing. The management monitoring device 44 determines the states of the target equipment 22 and the central control device 32, more specifically, whether an abnormality has occurred in the target equipment 22 and the central control device 32, on the basis of the information received from the real-time detection devices 28 and 34, and the analyzed result. The management monitoring device 44 includes a detected data reception unit 50, a simulation unit (analysis unit) 52, an accumulation unit 53, and a determination unit 54.

The detected data reception unit 50 receives data transmitted from the real-time detection devices 28 and 34. The detected data reception unit 50 acquires all the data detected by the real-time detection devices 28 and 34. The simulation unit 52 includes an arithmetic unit 60, a central control device model 62, an equipment model 64, and a control device model 66. The arithmetic unit 60 performs simulation. The central control device model 62 is data that models the central control device 32. The equipment model 64 is data that models the target equipment 22 of the plant facility 12. The control device model 66 is data that models the control device 24 of the plant facility 12. The simulation unit 52 performs simulation on the operation of the industrial plant 10, on the basis of the models of the central control device model 62, the equipment model 64, and the control device model 66. The simulation unit 52 acquires information on a control instruction, in other words, a control command that is transmitted from the central control device 32 to the control device 24, from the real-time detection device 34. The control command is information on contents of the instruction that is output from the central control device 32 to the control device 24 and that controls the target equipment 22. On the basis of the control command (by inputting the control command to the model), the simulation unit 52 performs simulation of the industrial plant 10, and calculates simulation output data. The simulation output data is a calculated value of the output data in simulation, when the industrial plant is operated. In other words, the simulation output data is a calculated value of a parameter corresponding to the actual output data, when the industrial plant 10 is operated. The parameter of the output data is a parameter of the sensor value (for example, temperature) detected by the sensor 26, and the control result (for example, an amount of electricity) of the plant facility 12.

The accumulation unit 53 acquires data transmitted from the real-time detection devices 28 and 34 from the detected data reception unit 50, and accumulates and stores therein the data. In other words, the accumulation unit 53 accumulates and stores therein data prior to the latest (real-time) data detected by the real-time detection devices 28 and 34.

The previous data accumulated in the accumulation unit 53 includes data when the target equipment 22 and the central control device 32 are operated in a normal state (state when an abnormality has not occurred).

The determination unit 54 compares the data transmitted from the real-time detection devices 28 and 34 with the simulation result of the simulation unit 52. The determination unit 54 then determines whether an abnormality has occurred in the target equipment 22 and the central control device 32, on the basis of the comparison result. Moreover, the determination unit 54 compares the real-time data transmitted from the real-time detection devices 28 and 34 with the previous data stored in the accumulation unit 53. The determination unit 54 then determines whether an abnormality has occurred in the target equipment 22 and the central control device 32, on the basis of the comparison result.

Figure 3:
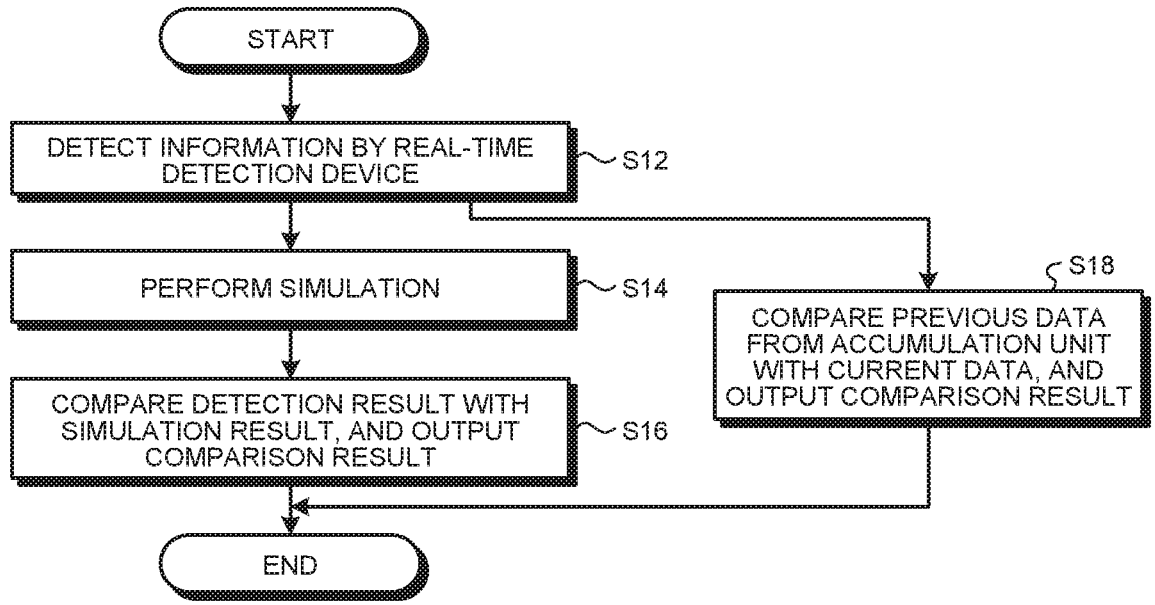
FIG. 3 is a flowchart illustrating an example of a process performed by the management monitoring system.

Hereinafter, an operation of the management monitoring system 18 will be described. FIG. 3 is a flowchart illustrating an example of a process performed by the management monitoring system. As illustrated in FIG. 3, the management monitoring system 18 detects operations of the target equipment 22 and the sensor 26 by the real-time detection device 28, detects the operation of the central control device 32 by the real-time detection device 34, and transmits the detection result to the management monitoring device 44 (step S12). The management monitoring system 18 simulates the operation state of the industrial plant 10 by the simulation unit 52 in the management monitoring device 44 (step S14). The simulation unit 52 performs simulation on the basis of the real-time (latest) control command detected by the real-time detection device 34, and calculates the simulation output data. The data detection by the real-time detection devices 28 and 34, and the simulation by the simulation unit 52 may be executed in parallel. The determination unit 54 in the management monitoring device 44 of the management monitoring system 18 compares the simulation result with the detection result, and outputs the comparison result (step S16). Moreover, the determination unit 54 in the management monitoring device 44 of the management monitoring system 18 acquires the previous data that has been stored in the accumulation unit 53 and that is transmitted from the real-time detection devices 28 and 34. Then, the determination unit 54 compares the previous data with the current data (real-time data) detected by the real-time detection devices 28 and 34, and outputs the comparison result (step S18). When it is determined that an abnormality has occurred, the determination unit 54 notifies the occurrence of abnormality, and when it is determined that an abnormality has not occurred, the determination unit 54 notifies that the industrial plant 10 is operated normally. When the industrial plant 10 is operated normally, the notification need not be made.

When it is determined that an abnormality has occurred, the management monitoring device 44 causes the central control device 32 to make a notification to that effect. For example, the management monitoring device 44 causes the central control device 32 to display a message indicating that an abnormality has occurred. Moreover, when it is determined that an abnormality has occurred, the management monitoring device 44 may stop the operations of the target equipment 22 and the central control device 32. Furthermore, when it is determined that an abnormality has occurred, the management monitoring device 44 may disconnect the target equipment 22 and the central control device 32 from the network (communication bus 16). The management monitoring device 44 may restore the network (communication bus 16) by connecting equipment alternative to the equipment (target equipment 22 and central control device 32) that is stopped or disconnected, to the network (communication bus 16). The management monitoring device 44 may also automatically activate the alternative equipment by virtual technology.

An example of determination performed by the determination unit 54 will now be described. In the determination at step S14, the determination unit 54 acquires the current value (latest value) of output data that is output when the industrial plant 10 is operated, from the real-time detection device 28. As described above, the current value of the output data is the detected value of each parameter such as a sensor value (for example, temperature) detected by the sensor 26, and the control result (for example, an amount of electricity) of the plant facility 12. The determination unit 54 then acquires simulation output data from the simulation unit 52. The determination unit 54 compares the values of the output data with the simulation output data of the same parameter (for example, temperature). If the difference between the values is equal to or more than a predetermined threshold, the determination unit 54 determines that an abnormality has occurred. If the difference between the values is less than the predetermined threshold, the determination unit 54 determines that abnormality has not occurred. Consequently, when the value of a control command is output to the target equipment 22 as an abnormal value and the value of the output data is output as a false normal-value due to cyber-attacks or the like, the management monitoring device 44 can detect the output of this false normal-value.

Moreover, on the basis of the state (output data) of the target equipment 22, the simulation unit 52 calculates an instruction, in other words, a control command output from the central control device 32. In other words, by calculating backward from the actual output data detected by the real-time detection device 28, the simulation unit 52 calculates a control command in simulation that should have been input when the output data is output. By comparing the actual control command detected by the real-time detection device 34 with the control command calculated by the simulation unit 52, the determination unit 54 determines whether an abnormality has occurred in the central control device 32. If the values of the actual control command detected by the real-time detection device 34 and the control command calculated by the simulation unit 52 are equal to or more than a predetermined threshold, the determination unit 54 determines that an abnormality has occurred. If the difference between the values of the actual control command detected by the real-time detection device 34 and the control command calculated by the simulation unit 52 is equal to or more than the predetermined threshold, the determination unit 54 determines that an abnormality has not occurred. Consequently, when the value of the control command is output to the target equipment 22 as an abnormal value and the value of the output data is output as a false normal-value due to cyber-attacks or the like, the management monitoring device 44 can detect the output of this false normal-value.

Furthermore, in the determination at step S16, the determination unit 54 acquires a parameter of the current (latest) control command, in other words, information on what type of control is to be performed on the target equipment 22, from the real-time detection device 34. Then, the determination unit 54 acquires a parameter of a previous control command, in other words, information on what type of control has been performed on the target equipment 22, from the accumulation unit 53. When the parameter of the current (latest) control command is deviated from the parameter of the previous control command, the determination unit 54 determines that an abnormality has occurred. When the parameter of the current (latest) control command is not deviated from the parameter of the previous control command, the determination unit 54 determines that an abnormality has not occurred. For example, when the contents of control carried out by the current (latest) control command are not performed by the contents of control carried out by the previous control command, the determination unit 54 determines that the parameter is deviated. Moreover, when the contents of control carried out by the current control command while the plant facility 12 is in a certain state (for example, when the plant facility 12 is activated, operated, or stopped) are different from the contents of control carried out by the previous control command while the plant facility 12 is in the same state (for example, when the plant facility 12 is activated, operated, or stopped), the determination unit 54 determines that the parameter is deviated. Consequently, when such control that has not been performed previously is about to be performed due to cyber-attacks or the like, the determination unit 54 can determine that the control is abnormal.

Still furthermore, in the determination at step S16, the determination unit 54 acquires a parameter of the current (latest) output data, in other words, information on what type of output data is to be transmitted to the outside, from the real-time detection device 28. The determination unit 54 then acquires a parameter of the previous output data, in other words, information on what type of output data has been transmitted to the outside, from the accumulation unit 53. When the parameter of the current (latest) output data is deviated from the parameter of the previous output data, the determination unit 54 determines that an abnormality has occurred. When the parameter of the current (latest) output data is not deviated from the parameter of the previous output data, the determination unit 54 determines that an abnormality has not occurred. For example, when the parameter of the output data to be output to the outside is not included in the parameter of the output data that has been previously output, the determination unit 54 determines that the parameter is deviated. Moreover, when the parameter of the output data that is output when control is executed by a certain control command, is different from the parameter of the output data that is output when control is executed by the same control command in the past, the determination unit 54 determines that the parameter is deviated. Thus, when the output data of the parameter that has not been output to the outside is about to be output to the outside by cyber-attacks or the like, the determination unit 54 determines that the output is abnormal.

Still furthermore, when the transmission destination of the instruction (control command) output from the central control device 32, the control result of the plant facility 12, or the sensor value is different from the simulation result of the simulation unit 52 and the previous results obtained by the accumulation unit 53, the determination unit 54 determines that an abnormality has occurred. In this manner, by detecting a change in the transmission destination by performing comparison with the simulation result or the previous data, it is possible to detect that data is sent to the transmission destination that has not been set, due to cyber-attacks or the like.

Still furthermore, when the transmission contents of the instruction (control command) output from the central control device 32, the control result of the plant facility 12, or the sensor value are different from the simulation result of the simulation unit 52 and the previous results obtained by the accumulation unit 53, the determination unit 54 determines that an abnormality has occurred. In this manner, by determining the transmission contents, it is possible to detect that a different instruction and different data are transmitted. Consequently, it is possible to determine whether the industrial plant 10 is properly operated.

Still furthermore, when the transmission order of the instruction (control command) output from the central control device 32, the control result of the plant facility 12, or the sensor value is different from the simulation result of the simulation unit 52 and the previous results obtained by the accumulation unit 53, the determination unit 54 determines that an abnormality has occurred. In this manner, by determining the transmission order, it is possible to detect that a different instruction and different data are transmitted. Consequently, it is possible to determine whether the industrial plant 10 is properly operated.

When the transmission frequency or the amount of transmission data of the instruction (control command) output from the central control device 32, the control result of the plant facility 12, the sensor value, or the like is different from the simulation result of the simulation unit 52 and the previous results obtained by the accumulation unit 53, the determination unit 54 determines that an abnormality has occurred. In this manner, by determining the transmission frequency and the amount of transmission data, it is possible to detect that unnecessary data is transmitted, or detect that necessary data is not transmitted. Consequently, it is possible to determine whether the industrial plant 10 is properly operated, and whether a data leakage has occurred.

If the relation between the instruction (control command) output from the central control device 32, the control result of the plant facility 12, and the sensor value is different from the simulation result of the simulation unit 52 or the previous results obtained by the accumulation unit 53, the determination unit 54 determines that an abnormality has occurred. By determining the relation in this manner, it is possible to detect a deviation between the instruction and the operation to be executed, and the detected result and the operation result. Consequently, it is possible to determine whether the industrial plant 10 is properly operated.

Moreover, by comparing the current value (latest value) of the instruction (control command) output from the central control device 32, the control result of the plant facility 12, or the sensor value, with the previous value of the instructions (control command) accumulated in the accumulation unit 53, the control result of the plant facility 12, or the sensor value, the determination unit 54 can detect or predict an abnormality. For example, the determination unit 54 may first calculate the average value of the output data (control result and sensor value) accumulated in the accumulation unit 53. Then, when the current output data is statistically deviated from the average value, the determination unit 54 determines that the target equipment 22 corresponding to the output data is abnormal (broken down). Moreover, on the basis of the control commands accumulated in the accumulation unit 53 and the detected latest control command, the determination unit 54 counts the number of times that the same control is performed. When the number of times that the same control is performed exceeds a threshold, the determination unit 54 predicts that there is a high possibility that an abnormality (breakdown) will occur in the target equipment 22 to be controlled.

Furthermore, on the basis of the latest data transmitted from the real-time detection devices 28 and 34, and the previous data accumulated in the accumulation unit 53, the management monitoring device 44 updates the simulation model (central control device model 62, equipment model 64, and control device model 66). For example, the performance of the target equipment 22 may be changed, due to degradation and characteristics of individual pieces of equipment. In such a case, by updating the simulation model, the management monitoring device 44 can perform more accurate simulation corresponding to the change in the performance. For example, the management monitoring device 44 updates the simulation model from the latest data transmitted from the real-time detection devices 28 and 34, and updates the threshold for determining abnormality. Consequently, it is possible to improve the accuracy of detecting abnormality. Moreover, by updating the simulation model, the management monitoring device 44 can calculate the most efficient operational parameter (value of control command) of the target equipment 22, on the basis of the simulation. Furthermore, for example, by updating the simulation model, the management monitoring device 44 can change the value of the control command with respect to the target equipment 22 that is suspected to be abnormal, detect the condition that has a high reproducibility of abnormality in simulation, and specify the cause of abnormality. Still furthermore, by updating the simulation model, the management monitoring device 44 can more accurately predict the occurrence of abnormality by simulation.

Still furthermore, in the management monitoring device 44, the simulation unit 52 calculates output data faster than the plant facility 12 performing actual processing. In other words, in the simulation unit 52, the speed from when a control command is input to when the simulation output data is calculated is faster (for example, faster by five times) than the speed from when a control command is input to the target equipment 22 to when the variation result of the output data reflecting the control command is generated. This makes it possible to analyze faster than the real time, and to predict, stop, or warn abnormality such as future overload.

As described above, the management monitoring system 18 according to the present embodiment includes the real-time detection devices 28 and 34, and the management monitoring device 44. The real-time detection device 28 detects the state (output data) of the target equipment 22. The real-time detection device 34 detects the control instruction (control command) output from the central control device 32 that supplies a control instruction to the target equipment 22. The management monitoring device 44 acquires information (output data and control command) from the real-time detection devices 28 and 34. The management monitoring device 44 includes the simulation unit 52 (analysis unit) and the determination unit 54. The simulation unit 52 simulates the state (output data) of the target equipment 22, with the models of the target equipment 22 and the central control device 32. The determination unit 54 compares the results calculated by the analysis unit with the information acquired from the real-time detection devices 28 and 34, and determines whether an abnormality has occurred in the target equipment 22. It is to be noted that the real-time detection devices 28 and 34 may be a single device or three or more devices, instead of being two devices as described above.

In the management monitoring system 18, the simulation unit 52 performs simulation on the basis of the information detected by the real-time detection devices 28 and 34. In the management monitoring system 18, on the basis of the simulation result calculated by the simulation unit 52, and the actual information detected by the real-time detection devices 28 and 34, the determination unit 54 detects whether an abnormality has occurred in the target equipment 22. For example, an abnormality can occur in the target equipment 22 and the central control device 32 due to cyber-attacks. In such a case also, when an abnormality has occurred in communication information due to cyber-attacks and the target equipment 22 is operated abnormally in reality, in some cases the information detected by the real-time detection devices 28 and 34 cannot indicate abnormality. In other words, in such a case, it is not possible to monitor whether the industrial plant 10 is properly operated under the influence of cyber-attacks. With the management monitoring system 18 according to the present embodiment, it is possible to confirm whether the target equipment 22 is operated as simulated, by performing simulation with the information detected by the real-time detection devices 28 and 34. Thus, the management monitoring system 18 can monitor the industrial system (for example, target equipment 22) to be managed with high accuracy when cyber-attacks occurs, for example.

Moreover, the management monitoring system 18 is installed in a facility where the target equipment 22 is installed. Thus, even when monitoring a large amount of data, the management monitoring system 18 can appropriately monitor the large amount of data without increasing the communication volume with the outside.

Furthermore, the determination unit 54 updates a predetermined threshold (abnormality determination threshold) for determining abnormality, on the basis of the information (latest data) of the real-time detection devices 28 and 34. By updating the abnormality determination threshold on the basis of the latest information, the management monitoring system 18 can monitor with higher accuracy.

Still furthermore, the analysis unit (simulation unit 52) calculates the instruction, in other words, the control command output from the central control device 32, on the basis of the state (output data) of the target equipment 22. The determination unit 54 compares the instruction (control command) calculated by the analysis unit with the instruction (control command) detected and acquired by the real-time detection device 34, and determines whether an abnormality has occurred in the central control device 32. The management monitoring system 18 calculates the control command by calculating backward from the state of the target equipment 22, and compares the calculated control command with the actual control command. Consequently, the management monitoring system 18 can appropriately monitor whether the central control device 32 has an abnormality (outputs an abnormal instruction).

Still furthermore, the management monitoring system 18 includes the accumulation unit 53 that accumulates the previous information detected by the real-time detection devices 28 and 34. The determination unit 54 determines whether an abnormality has occurred in the target equipment 22, by comparing the previous information accumulated in the accumulation unit 53 with the current information detected by the real-time detection devices 28 and 34. By comparing the current state with the previous state when an abnormality has not occurred, the management monitoring system 18 can further improve the monitoring accuracy.

Among the processes described in the present embodiment, all or a part of the processes described as being automatically performed may be manually performed, or all or a part of the processes described as being manually performed may be automatically performed with a known method. In addition, processing procedures, control procedures, specific names, and information including various types of data and parameters described in the above specification and drawings may be optionally changed, unless otherwise specified.

The embodiment described above and the modifications are included in the technology disclosed in the present specification, and are included in the invention described in the claims and their equivalents.

REFERENCE SIGNS LIST

10 Industrial plant
12 Plant facility
14 Control unit
16 Communication bus
18 Management monitoring system
22 Target equipment
24 Control device
26 Sensor
28, 34 Real-time detection device
32 Central control device
42 Communication bus
44 Management monitoring device (security management device)
50 Detected data reception unit
52 Simulation unit
53 Accumulation unit
54 Determination unit
60 Arithmetic unit
62 Central control device model
64 Equipment model
66 Control device model

The invention claimed is:

1. A monitoring system, comprising:
a first real-time detection device configured to detect output data of target equipment;
a second real-time detection device configured to detect a control instruction to be input to the target equipment, the control instruction being output from a central control device configured to receive an operation from an operator; and
a monitoring device configured to acquire the output data from the first real-time detection device and acquire the control instruction from the second real-time detection device,
wherein the monitoring device is configured to function as
a simulation unit configured to simulate the target equipment, with models of the target equipment and the central control device, and calculate a control instruction to be required to output the output data from the target equipment by calculating backward from the output data acquired from the first real-time detection device, and
a determination unit configured to determine that an abnormality has occurred in the target equipment, when a difference between the control instruction calculated by the simulation unit and the control instruction acquired from the second real-time detection device is equal to or more than a threshold.

2. The monitoring system according to claim 1, wherein the monitoring device is installed in a facility where the target equipment is installed.

3. The monitoring system according to claim 1, wherein the determination unit is configured to update the models and the threshold, based on the output data acquired from the first real-time detection device and the control instruction acquired from the second real-time detection device.

* * * * *